Aug. 26, 1947.  F. C. FAHNESTOCK  2,426,495
METHOD OF PRODUCING GASOLINE OF HIGH ANTIKNOCKING CHARACTERISTICS
Filed July 13, 1943
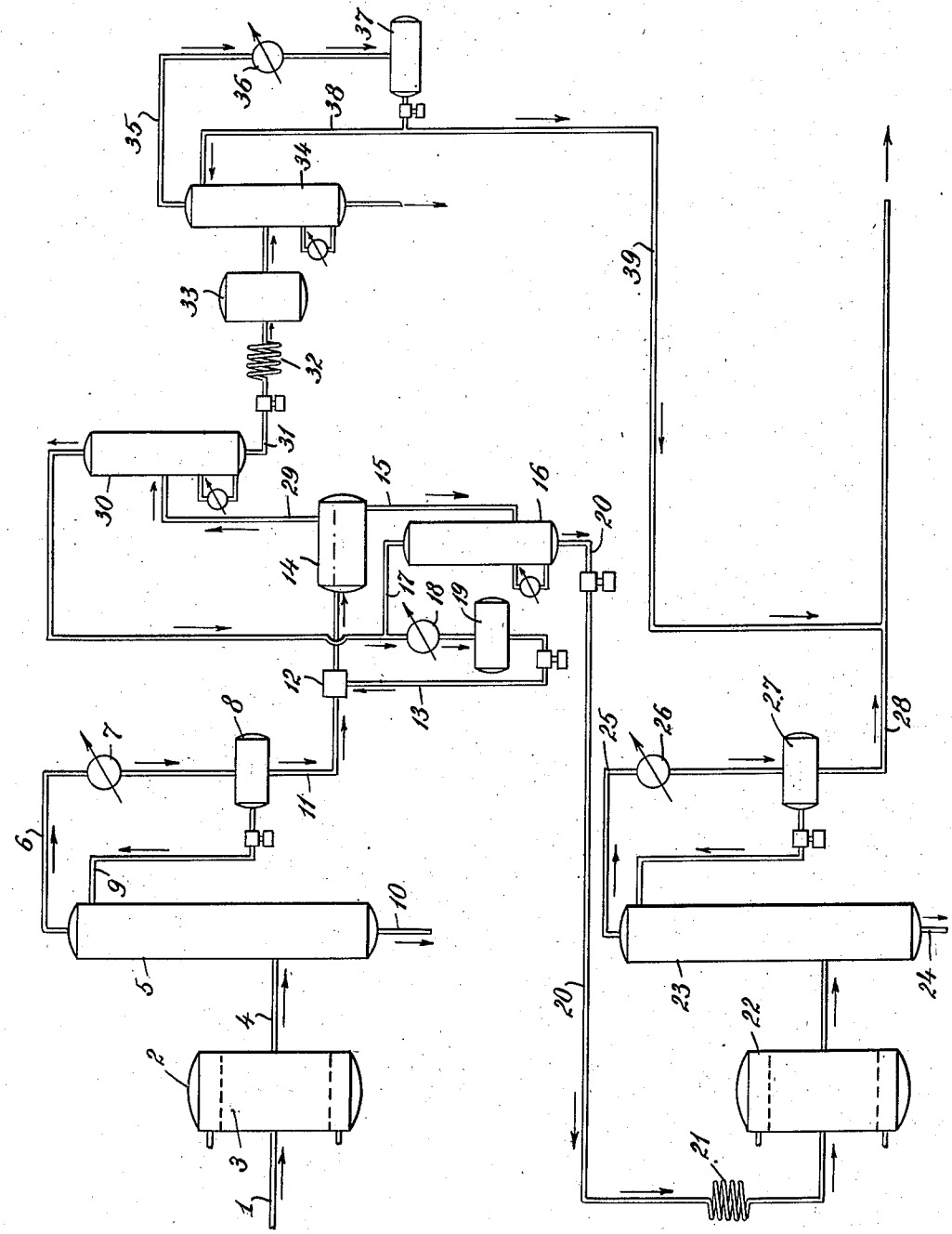
INVENTOR.
FRANK C. FAHNESTOCK
BY
ATTORNEY.

Patented Aug. 26, 1947

2,426,495

UNITED STATES PATENT OFFICE 2,426,495

METHOD OF PRODUCING GASOLINE OF HIGH ANTIKNOCKING CHARACTERISTICS

Frank C. Fahnestock, Wenonah, N. J., assignor to Socony-Vacuum Oil Company, Incorporated, a corporation of New York Application July 13, 1943, Serial No. 494,482

4 Claims. (Cl. 196—52)

This invention has to do with methods for the production of gasoline of high anti-knock capability by methods of catalytic cracking in the presence of a solid adsorptive contact mass material. It is well known that hydrocarbon fractions of the nature of gas oil may be passed in the vapor phase at reaction temperatures of about 800° F. and upwards into contact with solid adsorptive contact mass materials of the general nature of naturally treated and altered clays or various synthetic associations of alumina, silica and other substances to produce a useful conversion to materials in the gasoline boiling range. It is also well known that these materials in the gasoline boiling range produced by such a reaction may have other anti-knock characteristics raised by retreatment under substantially similar conditions in a similar contact mass.

This invention is specifically concerned with the conduct of such operations and has for its object, the provision of a method of operation capable of producing a material of higher anti-knock capability than is usually obtained by the process above outlined.

This invention is based upon the discovery that highly paraffinic constituents of an originally produced material of gasoline boiling range not only are capable of passing through a second catalytic operation essentially unchanged, but also when present in the second pass product detract materially from the anti-knock capability of that product since they not only have an extremely low anti-knock capability themselves, but also are apparently capable of masking the anti-knock value of other products of the reaction to a much greater degree than would be assumed from their own low anti-knock value. In shorter terms, these compounds appear to have a blending value which is much below their own anti-knock value.

In order to surmount this difficulty, there has been provided a process which removes these materials from the gasoline-like product of the first pass operation prior to subjecting that material to the second pass operation. To perform this separation, the gasoline product of the first pass operation may be subjected to a solvent refining operation with an agent of relatively broad solvent power capable of accepting and dissolving as an extract all materials other than the most highly paraffinic materials present in the product produced by the first cracking pass. Liquid sulfur dioxide is an excellent and preferred reagent of this nature, although other reagents such as furfural, aliphatic alcohols, aldehydes, either alone or in mixtures, either with each other and/ or with sulfur dioxide, may be used under appropriate conditions peculiar to each reagent. After admixture with the solvent refining reagent followed by separation into a "raffinate" phase consisting principally of the most high paraffinic materials present in the gasoline-like product and an extract phase comprising the solvent refining reagent and the other materials originally present in the gasoline-like product, the extract phase is withdrawn freed of the solvent refining reagent and utilized as charge for the second pass catalytic cracking operation. When this material substantially freed of high paraffinic material is so used, there is found to be an increased degree of anti-knock capability in the resulting product over that obtained when the entire gasoline-like first pass product is retreated. The raffinate phase which may be first freed of that portion of solvent refining reagent associated with it, may be treated separately by processes appropriate to change its chemical nature, as, for example, by isomerization, cyclization, or even by thermal reforming to give a product of greater capability.

The process can be readily understood by reference to the attached drawing, the single figure of which shows in diagrammatic form a set up of apparatus suitable for the accomplishment of the process. Hydrocarbon vapors such as those of a gas oil boiling substantially between about 550° and 750° F., heated to a temperature of about 850° F. may be passed through pipe 1 into a reactor 2 which is filled with a solid adsorptive catalytic material of clayey nature 3 such as one obtained by pelleting Super-Filtrol. Effluent vapors from the reactor pass through pipe 4 into fractionating tower 5. Products of gasoline boiling range are withdrawn from that tower through pipe 6 to be condensed at 7 and collected in 8, from which a portion of the liquid may be returned for reflux control at 9. Products heavier than the material of gasoline boiling range may be withdrawn from this tower at 10. First pass gasoline material withdrawn from collector 8 through pipe 11 and contacted in mixer 12 with a solvent refining reagent such as sulfur dioxide introduced through pipe 13 is permitted to settle in vessel 14 and divide into a raffinate and an extract phase. The extract phase withdrawn from pipe 15 may be freed of solvent refining reagent in a fractionator 16. The vapors of the solvent refining reagent passing off through pipe 17 may be cooled in 18 and condensed and collected in 19 from which they are returned through pipe 13 to mixer 12. The extracted material free of solvent refining reagent is removed through pipe 20 and passed through heating coil 21 wherein it is again heated to a temperature in excess of 800° F. and passed through a second catalyst chamber 22 containing a solid adsorptive catalytic material of the same nature as that used in the first operation. Products of reaction are fractionated in 23, material of higher boiling range than that desired in the final gasoline being discarded at 24, with the desired cut of aviation gasoline boiling range passing overhead through pipe 25 to be cooled at 26, collected at 27, and removed from the process through 28. Returning to settler 14, the raffinate phase withdrawn through pipe 29 is distilled in 30 to remove solvent refining reagent which joins that produced in still 16. The raffinate freed of solvent refining reagent is removed through pipe 31, heated in coil 32, and subjected to isomerization in the presence of an isomerizing catalyst contained in reactor 33. The product of this reaction is subjected to fractionation in still 34, resulting in the production of an isomerized material of suitable boiling range for incorporation in the desired aviation gasoline product, which material is passed overhead through pipe 35, cooled and condensed at 36 and collected in 37. A suitable portion of this product may be returned for fractionator control through pipe 38, the remainder passing through pipe 39 to be included in the total aviation gasoline output of the process.

As one example of what may be accomplished by use of the present process, the following is given:

A heavy gasoline fraction boiling from 200° F. to 500° F. is produced by either thermal or catalytic operation. This cut may for example contain 35% of aromatic materials. This cut is charged to the solvent treatment step. A raffinate is produced which is essentially denuded of aromatic materials, and there results an extract having an aromatic content of about 75% by volume. This extract will contain materials too heavy in boiling range for inclusion in aviation gasoline and some non-aromatic components which would be detrimental to the quality of the product. This cut is charged to a catalytic treater operating with a recycle ratio of two parts of cycle to one part of fresh feed at a temperature of 850° to 900° F. The resultant product from this operation fractionated to 325° F. endpoint will have an octane when leaded with 4 cc. of TEL in excess of 100 octane by the 1-C method. When rated by the 3-C method the rating of this material will be in excess of iso-octane plus 6 cc. of TEL.

I claim:

1. Method of producing cracked gasoline of high anti-knock capability comprising subjecting petroleum gas oil to cracking to gasoline, separating out the material of gasoline boiling range formed in this cracking, subjecting this gasoline to solvent refining in the presence of an extractive agent under such conditions as to separate from the gasoline substantially only the most highly paraffinic, substantially straight-chain compound portion thereof, rejecting such paraffinic portion, freeing the remainder of extractive agent, and again subjecting this remainder to cracking conditions in the presence of solid adsorptive catalytic material, and selecting a gasoline of desired boiling range from the products of the second cracking, said gasoline being substantially free of any constituent originating in the highly paraffinic portion of the gasoline cut produced by the first cracking.

2. The method of claim 1 in which the solvent extractive agent employed is sulfur dioxide.

3. Method of producing catalytically cracked gasoline of high anti-knock capability comprising subjecting petroleum gas oil to cracking to gasoline in the presence of a solid adsorptive catalytic contact mass, separating out the material of gasoline boiling range formed in this cracking, subjecting this gasoline to solvent refining in the presence of an extractive agent under such conditions as to separate from the gasoline substantially only the most highly paraffinic, substantially straight-chain compound portion thereof, rejecting such paraffinic portion, freeing the remainder of extractive agent, and again subjecting this remainder to cracking conditions in the presence of solid adsorptive catalytic material, and selecting a gasoline of desired boiling range from the products of the second cracking, said gasoline being substantially free of any constituent originating in the highly paraffinic portion of the gasoline cut produced by the first cracking.

4. The method of claim 3 in which the solvent extractive agent employed is sulfur dioxide.

FRANK C. FAHNESTOCK.

REFERENCES CITED

The following references are of record in the file of this patent:

UNITED STATES PATENTS

| Number | Name | Date |
|---|---|---|
| 2,131,169 | English | Sept. 27, 1938 |
| 2,143,472 | Boultbee | Jan. 10, 1939 |
| 2,283,854 | Friedman et al. | May 19, 1942 |
| 2,304,183 | Layng et al. | Dec. 8, 1942 |
| 2,322,673 | Sweeney | June 22, 1943 |